Aug. 26, 1958 A. P. HELDENBRAND 2,849,021
AUTOMATIC HYDRAULIC PRESSURE RELEASE DEVICE
Filed Feb. 1, 1954 3 Sheets-Sheet 3

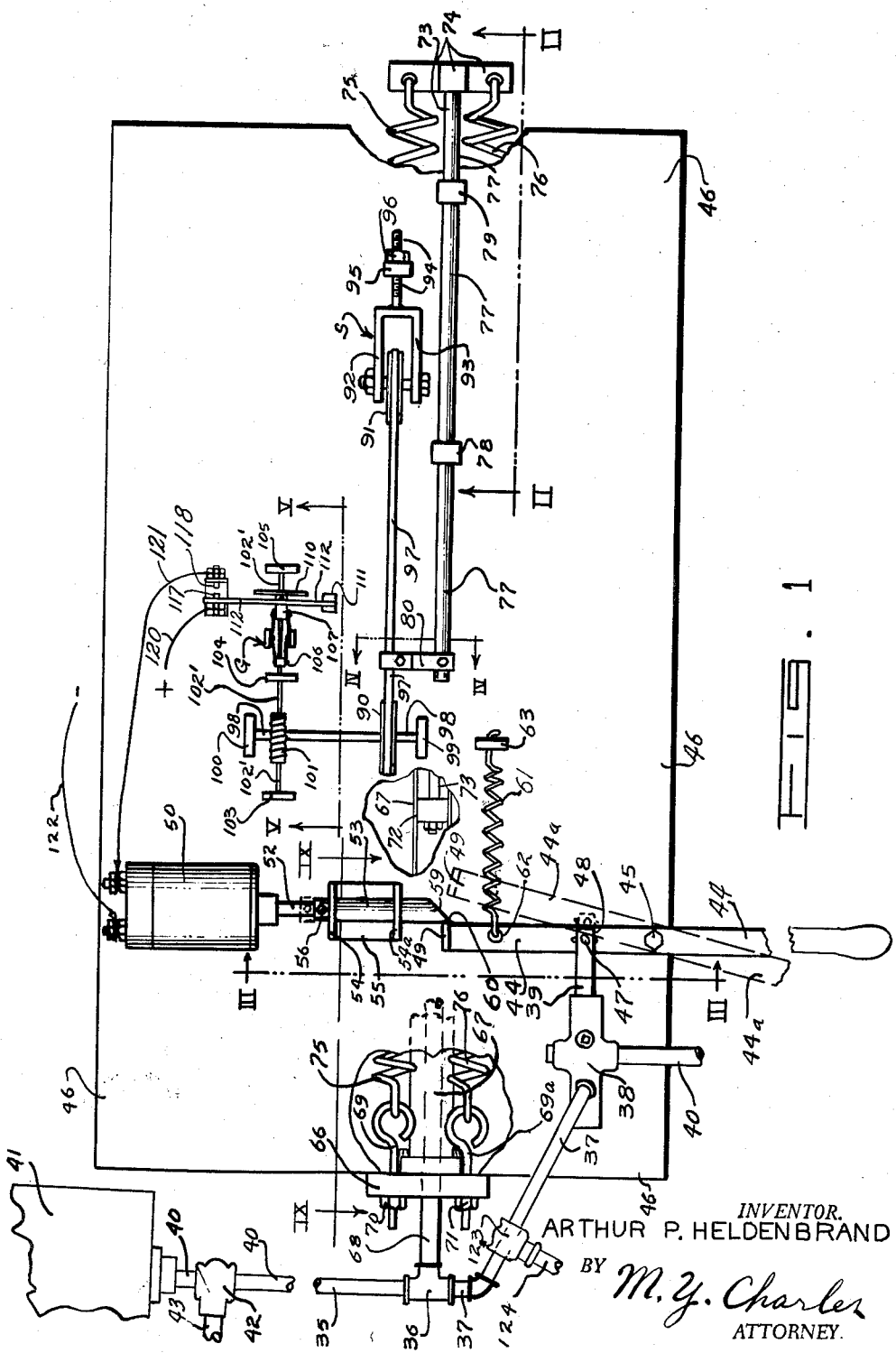

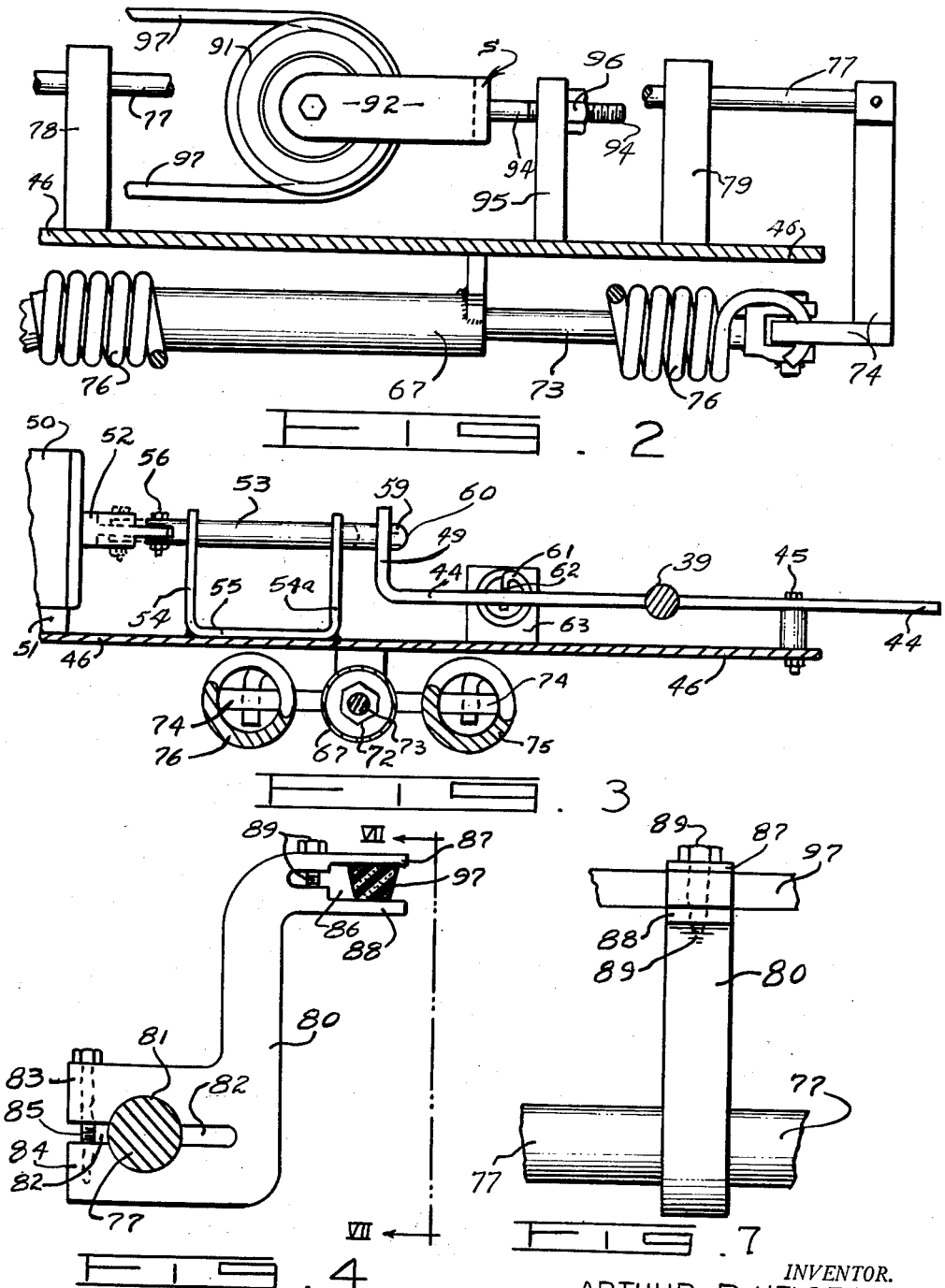

INVENTOR.
ARTHUR P. HELDENBRAND
BY
M. Y. Charles
ATTORNEY.

United States Patent Office 2,849,021
Patented Aug. 26, 1958

2,849,021

AUTOMATIC HYDRAULIC PRESSURE RELEASE DEVICE

Arthur P. Heldenbrand, Oklahoma City, Okla.

Application February 1, 1954, Serial No. 407,481

2 Claims. (Cl. 137—467)

This invention relates to an improvement in an automatic hydraulic pressure release device that is applicable for use in many machines or operations, but the device is designed particularly for use on my machine for testing the tensile strength of tubular goods (pipe), and pump rods such as may be used in oil or water wells and the like. This machine is disclosed in my co-pending application for a patent on the machine filed March 8, 1954, Ser. No. 414,614. In this application the machine is shown as being controlled by the hydraulic pressure release device shown and claimed in this specification and accompanying drawings.

The object of the hydraulic pressure release device is to permit a hydraulic pressure to continue so long as the pressure is increasing and upon any hesitation or discontinuance of the pressure increasing the device will instantly release all of the built up hydraulic pressure in the manner above necessary in the machine and process of testing mentioned.

A further object of the hydraulic pressure release device is to provide such a device that is simple, inexpensive, accurate in its work and one that is sturdy, durable and long lived.

Now referring to the accompanying drawings in which similar numerals of reference designate the same parts throughout the several figures of the drawings:

Fig. 1 is a side view of the hydraulic pressure release device.

Fig. 2 is a detail side view of a portion of the device, the view being as seen from the line II—II in Fig. 1 and looking in the direction of the arrows.

Fig. 3 is a vertical detail sectional view through the device, the view being as seen from the line III—III in Fig. 1 and looking in the direction of the arrows.

Fig. 4 is an enlarged detail sectional view through a portion of the device, the view being as seen from the line IV—IV in Fig. 1 and looking in the direction of the arrows.

Fig. 7 is a detail sectional view through a portion of the device, the view being as seen from the line VII—VII in Fig. 4 and looking in the direction of the arrows.

Figure 5:
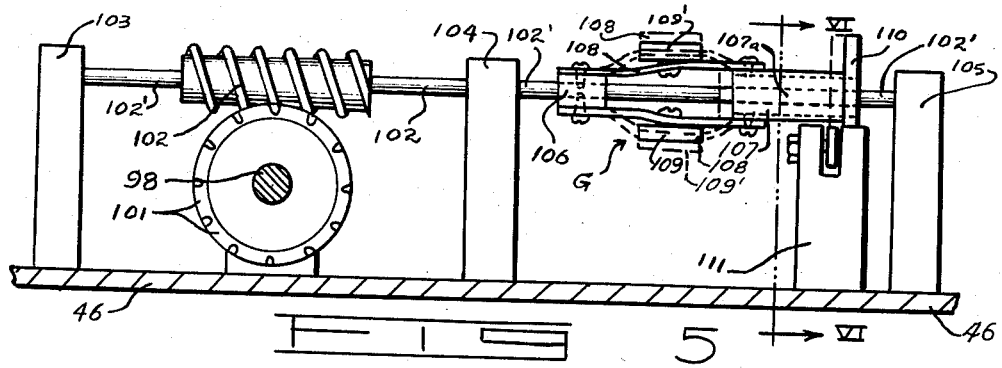
Fig. 5 is a sectional and side view of a part of the device, the view being as seen from the line V—V in Fig. 1 and looking in the direction of the arrows.

In the drawings the device is shown as having a hydraulic pressure feed pipe 35, one end of which is connected with the discharge of any suitable type of a hydraulic pump (not shown) and the other end of the pipe line 35 is connected into the discharge connection of the hydraulic pressure cut off valve 38. The other end of the hydraulic pressure release and return pipe line 40 is connected into a hydraulic supply and receiving reservoir or tank 41 and in the relief and return pipe line 40 is a T pipe fitting 42 from which leads a pump feed pipe line 43 that connects with the feed intake of the hydraulic pressure pump (not shown) but above mentioned.

To set the control device for operation, the valve lever 44 is moved from the dotted position 44a to the position 44, shown in full lines, whereupon the lip 49 has engaged the bevel 59 and raised the latch bar 53, whereupon the lip 49 passes beneath the lower end of the latch bar 53 and the lower end of the latch bar 53 will drop behind the lever lip 49 to hold the valve 38 in a closed position in the pipe line 37—40. Therefore as the pump (not shown) feeds hydraulic liquid through the pipe 35 into the hydraulic system between the pump and the valve 38 an ever increasing hydraulic pressure is being built up in the hydraulic system between the pump and the valve 38.

The device is further provided with a hydraulic pressure cut off valve operating lever 44 that is pivotally mounted at 45 on a supporting plate 46 and the outer end of the valve operating shaft 39 is pivotally connected by a pin 47 to the lever 44 and the pin 47 is operable in a slot 48 in the lever 44 to permit axial longitudinal movement of the valve operating shaft 39 as the lever 44 rocks in a normal arcuate movement. The upper end of the lever 44 is bent to form a horizontally positioned stop lip 49.

The device is further provided with a solenoid electric coil 50 that is supported by a bracket 51 that is rigidly carried by the supporting plate 46. A solenoid core 52 is longitudinally operable in the coil 50 in the usual manner in this type of coil. The device is further provided with a latch bar 53 that is slidably carried in holes in parallel legs 54 and 54a of a bracket 55 that is rigidly carried on the supporting plate 46. The upper end of the latch bar 53 is solidly attached or pinned at 56 to the lower end of the solenoid core 52. The lower end of the latch bar 53 is bevelled as shown at 59 to provide a sharp latch bar edge or point 60. The lower end portion 60 of the latch bar 53 is in engagement with the lever lip 49 to hold the lever 44 in a retracted position against the tension of a lever operating spring 61, one end of which is attached to the valve operating lever 44 at the point 62 and the other end of the spring 61 is attached to a spring bracket 63 that is rigidly carried on the supporting plate 46. The spring 61 urges movement of the valve operating lever 44 in a clockwise direction to the dotted position 44a as will later be described.

On the back side of the support plate 46 is a rearwardly extending support lug 66 on which is rigidly mounted one end of a hydraulic cylinder 67 and one end of a hydraulic pressure pipe line 68 connects into the rear end of the cylinder 67, and the other end of the pipe line 68 connects into the third leg of the T pipe fitting 36.

On opposite sides of the hydraulic cylinder 67 is positioned a pair of I bolts 69 and 70, the legs of which are threaded and slidably pass through holes in the support lug 66, and nuts 70 and 71 are threaded, one each on the leg of the eye bolts 69 and 70 and bear against the support lug 66 so that by turning the nuts 70 and 71 the eye bolts are moved longitudinally for spring tension purposes as will later be made obvious.

In the cylinder 67 is a piston that is rigidly mounted on the inner end of a piston rod 73. The outer end of the piston rod 73 is rigidly mounted in an inverted T-shaped attachment element 74. On opposite sides of the hydraulic pressure cylinder 67 is positioned helical tension springs 75 and 76. One end of the springs 75 and 76 is attached to their respective eye bolts 69 and 70 and the other ends of the springs 75 and 76 is attached to their respective end portions of the cross head portion of the T attachment element 74. Now by turning the nuts 70 and 71 the tension of the springs 75 and 76 against the hydraulic pressure that may be introduced into the cylinder 67 may be adjusted.

The device is further provided with a pull rod 77 that is longitudinally slidably carried in bearing or support elements 78 and 79 that are rigidly mounted on the main support plate 46. One end of the pull rod 77 is rigidly mounted in the end of the leg of the inverted T shaped attachment element 74. On the other end of the pull rod 77 is mounted a slidably adjustable Z shaped clamp element 80. The free end of the lower horizontal leg of the Z 80 has a hole 81 therethrough in which the pull rod 77 is snugly but slidably seated. The lower horizontal leg of the Z is also provided with a longitudinally extending slot 82 that extends from the free end of the lower leg of the Z to and past the hole 81 to form two clamp legs 83 and 84 that are springable toward each other by means of a cap screw 85 that slidably passes through a hole in the clamp leg 83 and is threaded into an aligned hole in the clamp leg 84 whereby the two clamp legs 83 and 84 may be drawn toward each other to rigidly clamp and hold the pull rod 77 between the clamp legs 83 and 84 to rigidly hold the clamp element 80 in adjusted positions on the pull rod 77.

The free end of the upper horizontal leg of the Z shaped element 80 is also provided with a longitudinally disposed slot 86 therein whereby the upper horizontal leg of the Z shaped element 80 is divided into two parallel clamp legs 87 and 88 that are springable each toward the other in a clamping action by means of a cap screw 89 that is slidably passed through a hole in the clamp leg 87 and threaded into a hole in the clamp leg 88 so that by turning the cap screw 89 the clamp legs 87 and 88 may be drawn toward each other in a clamping action on the clamp legs 87 and 88 may be allowed to spring apart in the clamp releasing action for purposes that will later be made obvious.

The device is provided with an electric switch for operating the solenoid coil and core 50 and 52 and an automatic means for operating the switch. The means for operating the electric switch consists of a pair of V pulleys 90 and 91, one of which is revolvably mounted between the legs 92 and 93 of a U-shaped supporting element S, the closed end of which is provided with a rearwardly extending threaded stud 94 that slidably passes through a hole in a supporting element 95 that is rigidly carried on the main supporting plate 46. A nut 96 is threaded on the stud 94 and bears aginst the element 95 so that by turning the nut 96 the U-shaped element S and the V-belt pulley 91 carried thereby may be moved to tighten or loosen the V-belt 97 as will later be described.

The V-belt pulley 90 is rigidly mounted on the lower end of a shaft 98 that is revolvably carried in bearing elements 99 and 100 that are rigidly mounted on and are carried by the main support plate 46.

The V-belt pulleys 90 and 91 are aligned, each with the other and a V-belt 97 passes around and engages both V-belt pulleys 90 and 91 for purposes of driving the pulleys as will later be described.

The V-belt 97 passes through the slot 86 in the clamp element 80 and may be moved to any selected adjusted position therein, whereupon the clamp cap screw 89 may be turned to draw the clamp legs 87 and 88 toward each other to securely attach the clamp element 80 to the V-belt 97.

On the other or upper end portion of the shaft 98 is rigidly mounted a worm gear 101 that is in mesh with a worm 102 that is rigidly carried on a shaft 102' that is revolvably carried in bearings 103 and 104 and 105 that are rigidly carried on the main support plate 46.

Also on the shaft 102' is carried a governor like device G which consists of a sleeve element 106 that is rigidly fixed on the shaft. Also on the shaft 102' is another sleeve element 107 that is slidable longitudinally on the shaft 102'. The two sleeves 106 and 107 are spaced apart and joined together by a plurality of leaf spring 108 that are equally spaced apart and in the central portion of each leaf spring 108 is rigidly mounted a weight 109, each of which are equal in weight. On the outer end of the sleeve 107 is rigidly carried a disc 110 that speedily revolves with the sleeve 107 as the sleeve 107 is revolved by the shaft 102'.

As the governor like device G is revolved by the shaft 102' and the speed of the shaft increases the weights 109, under the influence of centrifugal force, will exert their force to spring the central portion of the leaf springs 108 outwardly thereby shortening the effective length of the springs 108 and thereby retracting the sleeve 107 and the disc 110 thereon.

The device is provided with an electric switch device that is operated by the movements of the disc 110. The electric switch device comprises a non-electrical conductor part 111 that is rigidly mounted on the main supporting plate 46. The free or outer end of the part 111 is slotted and one end of a leaf spring element 112 is seated in the slot and is rigidly held therein by means of a cap screw 113 that is passed through the post legs defining the slot and the end of the leaf spring 112. In the central portion of the leaf spring 112 is an electrical non-conductor thereon that slidably passes through a hole in the leaf spring 112 and a nut 116 is threaded on the stud 115 to rigidly hold the contact element 114 in place on the leaf spring 112, the contact element being engageable by the disc 110 for electric switch operating purposes as will later be described.

On the free or movable end of the leaf spring 112 is carried an electrical contact point 117 that is adapted to engage and disengage a second electrical contact point 118 that remains stationary and is rigidly mounted on a non-electrical conductor support 119 that is rigidly mounted on and carried by the main support plate 46.

One end of an electric conductor wire 120 is connected to the contact element 117 and the other end of the wire 120 connects to one side of an electric circuit which may be supplied from a battery, not shown, or any other suitable source of supply of an electric current. One end of a second electrical conductor wire 121 is connected with the second electrical contact element 118 and the other end of the wire 121 connects with one end of the coil wire of the solenoid coil 50, and the other end of the solenoid coil wire 122 connects with the other side of the feed of the electric circuit.

In the pipe line 37 is a T pipe fitting 123 from which extends a hydraulic pressure feed pipeline 124 that connects with the hydraulic appliance that is to be controlled by the foregoing described control device.

The operation of the control device is as follows: The device is, of course, used in conjunction with some appliance and as a control of the hydraulic pressure employed therein, therefore the other end of the pipe line 124 is connected into the hydraulic pressure pipe system of the appliance to be controlled.

Figures 6, 8:
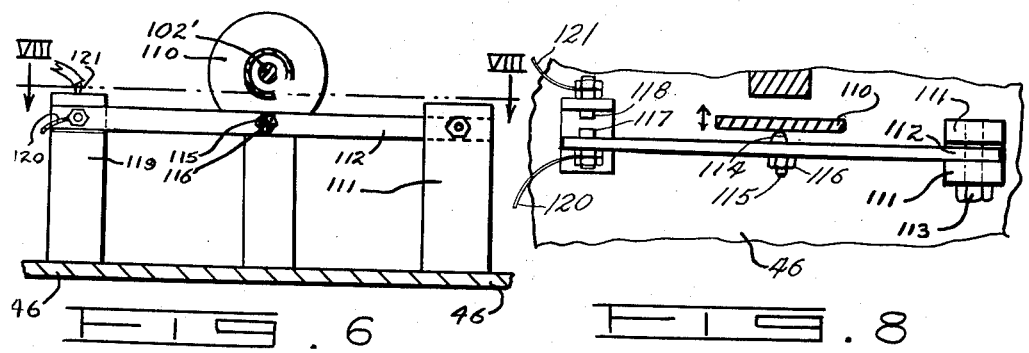
Fig. 6 is a detail sectional view through a portion of the device, the view being as seen from the line VI—VI in Fig. 5 and looking in the direction of the arrows.
Fig. 8 is a detail sectional view through a portion of the device, the view being as seen from the line VIII—VIII in Fig. 6 and looking in the direction of the arrows.
Figure 9:
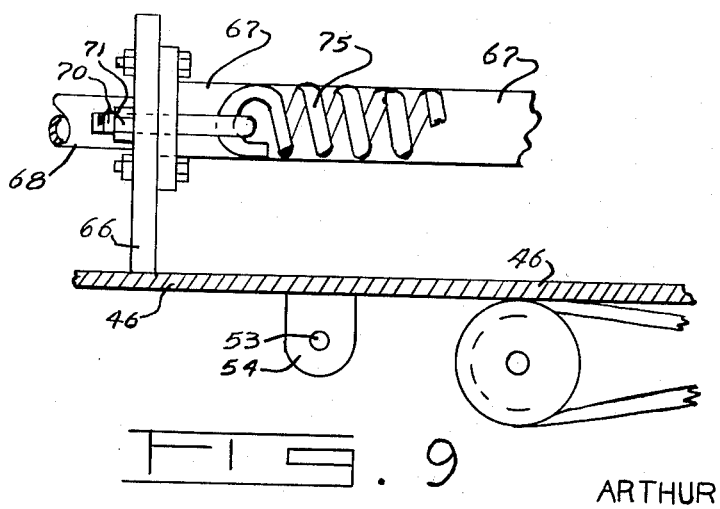
Fig. 9 is a detail sectional view through a portion of the device, the view being as seen from the line IX—IX in Fig. 1 and looking in the direction of the arrows.

This having been done the valve lever handle 44 is moved in an anti-clock wise direction from the dotted position 44a to the full line position 44, whereupon the valve 38 is closed and pressure from the pump begins to build up in the hydraulic system, and as this pressure continues to increase the ever increasing hydraulic pressure is fed to the appliance and to the control device through the pipe lines 35, 68, 37 and 124 and as the pressure increases the piston 72 in the cylinder 67 is forced to move toward the outer end of the cylinder 67 and also move the piston rod 73 with it and against the resisting tension of the helical coil springs 75 and 76. In the movement of the piston rod 73 the pull rod 77 is similarly longitudinally moved and in turn, through the clamp element 80, the V-belt 97 is moved to revolve the V-belt pulley 90 and shaft 98 and the worm gear 101 which in turn speedily drives the worm 102 and shaft 102' whereupon the governor weights 109, under the influence of centrifugal force move outwardly to a position as indicated by the dotted lines 109', whereupon the disc 110 engages the contact element 114 and move the leaf spring to such a position that the electrical contact points 117 and 118 disengage each other as shown in Fig. 8. This action continues until the increase of the hydraulic pressure ceases at least momentarily as is the case in the device and process disclosed in the above mentioned copending application Serial Number 414,614, whereupon the movement of the piston rod 73 and all of its subsequent associated parts will therefore cease their actions, wherefore the leaf springs 108 will return to their original position and move the disc 110 to disengage the contact element 114, whereupon the leaf spring 112 will move the electrical contact point 118, whereby the electric circuit in which the solenoid electric coil 50 is included and the coil 50 is therefore energized and therefore draws the solenoid core 52 into the coil 50 and withdraws the latch bar 53 from retaining engagement with the lever lip 49 whereupon the helical spring 61 instantly moves the valve operating lever 44 in a clockwise direction to the dotted position 44a whereupon the valve 38 is in an open position and the liquid exerting the hydraulic pressure is released to flow from the pump, cylinder 67 and from the appliance being operated through the pipe 124 into the pipe line 37 and through which the liquid from the other mentioned places flows through the valve 38 and pipe line 40 into the liquid supply tank 41 or through the pump supply line 43 or both. Simultaneously with this action of course, the hydraulic pressure is also released, therefore the helical springs 75 and 76 contract to withdraw the pistond 73 and piston 72 whereby the liquid in the cylinder 67 is pushed therefrom through the pipe line 68 and into the pipe line 37 as above mentioned.

Simultaneously with the action just described the pull shaft 77 and belt 91 are retracted and the entire control device is repositioned to repeat the operation above described.

While the control device as shown and described is probably the preferred form of the device, it is to be understood that such modifications of the device may be employed as lie within the scope of the appended claims without departing from the spirit and intention of the invention. Now having fully shown and described my invention, what I claim is:

1. In an automatic hydraulic pressure relief valve device; said device comprising a hydraulic pressure cylinder and means connecting the cylinder with a hydraulic pressure system, a hydraulic pressure relief valve, said valve being in a line of the hydraulic pressure system, means in the cylinder and extensible therefrom by hydraulic pressure introduced into the cylinder, a latch bar, means responsive to pressure change in a pressure increasing direction for positioning the latch bar for holding the hydraulic pressure relief valve in a closed position and for operating said latch bar to release the valve to an open position in response to a momentary cessation of hydraulic pressure increase in the hydraulic pressure system, said means for releasing the hydraulic pressure relief valve to an open position being operable from the said means extensible from the said hydraulic pressure cylinder, said relief valve having a lever handle thereon to open and close the valve, a spring, said spring being attached to the lever handle and tensioned to open the relief valve, said means for operating the latch bar comprising a solenoid electric coil having a longitudinally movable core therein, said latch bar engageable with the lever handle to hold the relief valve in a closed position, said latch bar being attached to the said core of the solenoid coil for movement thereby to release the lever handle for valve opening purposes, an electric switch, said solenoid coil and electric switch being included in an electric circuit whereby the coil may be operably controlled by the switch, a governor device, said governor device being associated with said electric switch for purposes of opening and closing the switch, and means intermediate the said governor device and the means extensible form the said cylinder for driving the governor.

2. In an automatic hydraulic pressure relief valve device; said device comprising a hydraulic pressure cylinder and means connecting the cylinder with a hydraulic pressure system, a hydraulic pressure relief valve, said valve being in a line of the hydraulic pressure system, means in the cylinder and extensible therefrom by hydraulic pressure introduced into the cylinder, a latch bar, means responsive to pressure change in a pressure increasing direction for positioning the latch bar for holding the hydraulic pressure relief valve in a closed position and for operating said latch bar to release the valve to an open position in response to a momentary cessation of hydraulic pressure increase in the hydraulic pressure system, said means for releasing the hydraulic pressure relief valve to an open position being operable from the said means extensible from the said hydraulic pressure cylinder; said relief valve having a lever handle thereon to open and close the valve, a spring, said spring being attached to the lever handle and tensioned to open the relief valve, said means for operating the latch bar comprising a solenoid electric coil having a longitudinally movable core therein, said latch bar being engageable with the lever handle to hold the relief valve in a closed position, said latch bar being attached to the said core of the solenoid coil for movement thereby to release the lever handle for valve opening purposes, an electric switch, said solenoid coil and electric switch being included in an electric circuit whereby the coil may be operably controlled by the switch, a governor device, said governor device being associated with said electric switch for purposes of opening and closing the switch, and means intermediate the said governor device and the means extensible from the said cylinder for driving the governor, said means intermediate the governor device and the means extensible from the said cylinder comprising a pull shaft connected with and movable with the means extensible from the cylinder, a revolvable drive shaft for revolvably driving a governor, said governor device being carried on the governor shaft for the operation thereof in opening and closing the said electric switch as aforesaid.

References Cited in the file of this patent
UNITED STATES PATENTS

| | | |
|---|---|---|
| 641,117 | Kaye | Jan. 9, 1900 |
| 844,923 | Cridge | Feb. 19, 1907 |
| 1,026,041 | Kimball | May 14, 1912 |
| 1,786,878 | Van Keuren | Dec. 30, 1930 |
| 1,947,602 | Kerr | Feb. 20, 1934 |
| 2,479,359 | Holt | Aug. 6, 1949 |